(12) United States Patent
Kobayashi et al.

(10) Patent No.: US 6,870,128 B2
(45) Date of Patent: Mar. 22, 2005

(54) LASER BORING METHOD AND SYSTEM

(75) Inventors: Toshio Kobayashi, Kosugi-machi (JP); Eiji Kogure, Tama (JP); Hiromitsu Yamamoto, Tokyo (JP)

(73) Assignee: Japan Drilling Co., Ltd., Tokyo (JP)

( * ) Notice: Subject to any disclaimer, the term of this patent is extended or adjusted under 35 U.S.C. 154(b) by 379 days.

(21) Appl. No.: 10/165,966

(22) Filed: Jun. 10, 2002

(65) Prior Publication Data

US 2003/0226826 A1 Dec. 11, 2003

(51) Int. Cl.⁷ .................. B23K 26/14; B23K 26/38
(52) U.S. Cl. ................. 219/121.7; 219/121.84
(58) Field of Search .................. 219/121.6, 121.67, 219/121.7–121.73, 121.78, 121.84, 121.85; 299/10, 14; 166/244.1; 175/11, 12, 14, 57

(56) References Cited

U.S. PATENT DOCUMENTS

| | | | |
|---|---|---|---|
| 3,461,964 A | 8/1969 | Venghiattis | |
| 3,493,060 A | 2/1970 | Van Dyk | |
| 3,539,221 A | 11/1970 | Gladstone | |
| 3,544,165 A | 12/1970 | Snedden | |
| 3,693,718 A | 9/1972 | Stout | |
| 3,871,485 A * | 3/1975 | Keenan, Jr. .................. | 175/16 |
| 3,882,945 A | 5/1975 | Keenan, Jr. | |
| 3,977,478 A | 8/1976 | Shuck | |
| 3,998,281 A | 12/1976 | Salisbury et al. | |
| 4,019,331 A | 4/1977 | Rom et al. | |
| 4,066,138 A | 1/1978 | Salisbury et al. | |
| 4,090,572 A | 5/1978 | Welch | |
| 4,113,036 A | 9/1978 | Stout | |
| 4,227,582 A | 10/1980 | Price | |
| 4,266,609 A | 5/1981 | Rom et al. | |
| 4,282,940 A | 8/1981 | Salisbury et al. | |
| 4,317,021 A * | 2/1982 | Walch et al. .......... | 219/121.67 |
| 4,403,664 A * | 9/1983 | Sullinger ...................... | 175/24 |
| 4,491,717 A | 1/1985 | Geffroy et al. | |
| 4,542,647 A | 9/1985 | Molnar | |
| 4,805,987 A | 2/1989 | Laakmann et al. | |
| 4,871,897 A | 10/1989 | Nielsen | |
| 4,913,505 A | 4/1990 | Levy | |
| 5,107,936 A | 4/1992 | Foppe | |
| 5,148,874 A | 9/1992 | Foppe | |
| 5,426,278 A | 6/1995 | Hirano et al. | |
| 6,626,249 B2 * | 9/2003 | Rosa ........................... | 175/16 |
| 6,755,262 B2 * | 6/2004 | Parker ......................... | 175/57 |

* cited by examiner

Primary Examiner—Samuel M. Heinrich
(74) Attorney, Agent, or Firm—Arnold & Ferrera

(57) ABSTRACT

A method for boring a well with a laser beam is provided, the method comprising: shining the laser beam into a conduit, wherein the laser beam is guided through the conduit by the internal reflectivity of said conduit; and extending the conduit into the well, so that the laser beam exiting the conduit shines onto an area in the well to be bored. A system for boring a well with a laser beam is also provided, the system comprising: a means for shining the laser beam into a conduit; wherein the laser beam is guided through the conduit by the internal reflectivity of said conduit; and a means for extending the conduit into the well, so that the laser beam exiting the conduit shines onto an area in the well to be bored. An apparatus is provided as well, comprising a conduit that is extendable into the well, and an inner surface inside of the conduit, wherein the inner surface is reflective to the laser beam.

14 Claims, 15 Drawing Sheets

LASER BORING METHOD AND SYSTEM

BACKGROUND

Many different methods of using lasers to bore a well have been attempted. Previous attempts have been frustrated by the problem of how to transmit a laser beam several miles into the well with sufficient power to bore a well. Lasers that can fit inside a well are generally not powerful enough to efficiently bore. Furthermore, the harsh conditions make it even more difficult to introduce delicate electronics.

Most methods rely on a laser on the surface that shines a laser beam into the well. Directing a laser beam from the surface introduces a further set of problems. For example, high-powered lasers tend to become un-focused over long distances; without some means of re-directing the light inside of the well itself, the laser can only bore a well in a straight line. Thus, there is a need for a means for transmitting a coherent laser beam into a curving well with enough power to efficiently bore the well. There is also a need for a system to handle a new means for transmitting a laser beam into a well.

Boring a well with a laser beam also introduces a problem of how wide of a well is to be bored. It is difficult to produce a beam with enough intensity to vaporize rock in a manner that would be efficient and also transmit the beam far enough. Traditionally, lasers with sufficient power that can be effectively transmitted vaporize an area that is too narrow to be useful. Therefore, a need exists for a means for increasing the area vaporized by the laser beam.

Finally, boring a well that is curved with a laser beam introduces a problem of how to prevent the system from becoming caught on the walls of the well. If the apparatus becomes stuck on the walls then extending the apparatus further into the well may prove impossible. Therefore there is a need for a means to prevent a laser boring system from sticking to the walls of the well.

SUMMARY OF THE INVENTION

One aspect of the invention is a method for boring a well with a laser beam. In an example embodiment, the method comprises: shining the laser beam into a conduit, wherein the laser beam is guided through the conduit by the internal reflectivity of said conduit; and extending the conduit into the well, so that the laser beam exiting the conduit shines onto an area in the well to be bored. In a more specific example, the method further comprises vaporizing material at the area in the well to be bored and evacuating vaporized material from the well, and diverging the laser beam exiting the conduit. Still a further embodiment comprises injecting gas into the conduit, transporting the gas into the well through the conduit, and injecting gas into the well.

In at least one example, the gas is diverted around the diverging lens, which is protected by directing the gas injected into the well towards the diverging lens, and the backflow of the gas in the conduit is blocked. Still another embodiment comprises extending a casing into the well, so that the conduit is inside of the casing when the conduit is extended into the well. The conduit and the casing are connected so that the casing is rotatable and the conduit is stationary. The casing is rotated in some embodiments and held essentially coaxially aligned with the casing. In yet a further embodiment, fluid is injected into the casing, transported into the well through the casing, and injected the fluid into the well.

According to another aspect of the invention, a system is provided for boring a well with a laser beam. The system comprises: a means for shining the laser beam into a conduit, wherein the laser beam is guided through the conduit by the internal reflectivity of said conduit, and a means for extending the conduit into the well, so that the laser beam exiting the conduit shines onto an area in the well to be bored. In a further embodiment, the system comprises a means for vaporizing the material at the area to be bored and a means for evacuating vaporized material from the well. In at least one more specific embodiment, a means is provided for diverging the laser beam exiting the conduit. A means is also provided for diverting the gas around the means for diverging the laser beam, which, in at least one embodiment, comprises the diverging means, and, in another embodiment, comprises a separate diverting means. Still a further embodiment comprises a means for injecting gas into the well to keep the diverging means clear of debris and thereby protect it. An embodiment of a means for injecting gas into the conduit and a means for transporting the gas into the well is also provided.

In yet a further embodiment, the system comprises a means for blocking the backflow of the gas in the conduit and a means for evacuating vaporized material from the well, as well as a means for extending a casing into the well and a means for preventing the casing from sticking to the wall of the well bore.

In still another example, the system further comprises a means for connecting the conduit and the casing, wherein the casing is rotatable and the conduit is stationary, and a means for holding the conduit essentially coaxially aligned with the casing. In an even further example, means are provided for injecting fluid into the casing, for transporting the fluid into the well, and for injecting the fluid into the well.

According to still another aspect of the invention a well boring apparatus is provided. The apparatus comprises a conduit that is extendable into the well and includes an inner surface of the conduit that is reflective to the laser beam. In a further embodiment, a diverging lens is located at the exit of the conduit diverges the laser beam entering the well. In at least one embodiment, the conduit comprises segments connected by joints, wherein the joints comprise, in some examples, a mechanism on both sides for coupling with the segments, a lens, a by-pass conduit for the gas to by-pass the lens, and a non-return valve in the by-pass conduit. In a variety of embodiments, a diverting lens diverts the gas around the diverging lens, and in other embodiments, the diverging lens diverts the gas around itself. Gas injected into the well, in at least one embodiment, is directed towards the diverging lens with directing plates.

In still a further embodiment, the apparatus comprises a rotatable casing that is extendable into the well, a top-drive coupled to the casing, and a swivel connecting the conduit to the casing. In yet a further example, the system comprises centralizers holding the conduit essentially coaxially aligned with the casing, and an annulus, formed by the casing and the conduit, for passage of injected fluid flows into the well. In some embodiments, the system further comprises a spool for extending and retracting the conduit which has a light-reflective material coating an inner surface of the conduit that is selected from a group consisting essentially of copper and aluminum. In a further embodiment, the coating also has an additional layer of a dielectric coating in contact with the light-reflective material.

BRIEF DESCRIPTION OF THE FIGURES

FIG. 11-1 shows a section view of an example embodiment of the invention.

FIG. 11-2 shows a section view of an example embodiment of the invention.

FIG. 11-3 shows a section view of an example embodiment of the invention.

FIGS. 12–15 show a set of sectional views illustrating a process embodiment of the invention.

DETAILED DESCRIPTION OF EXAMPLE EMBODIMENTS

Figure 1:
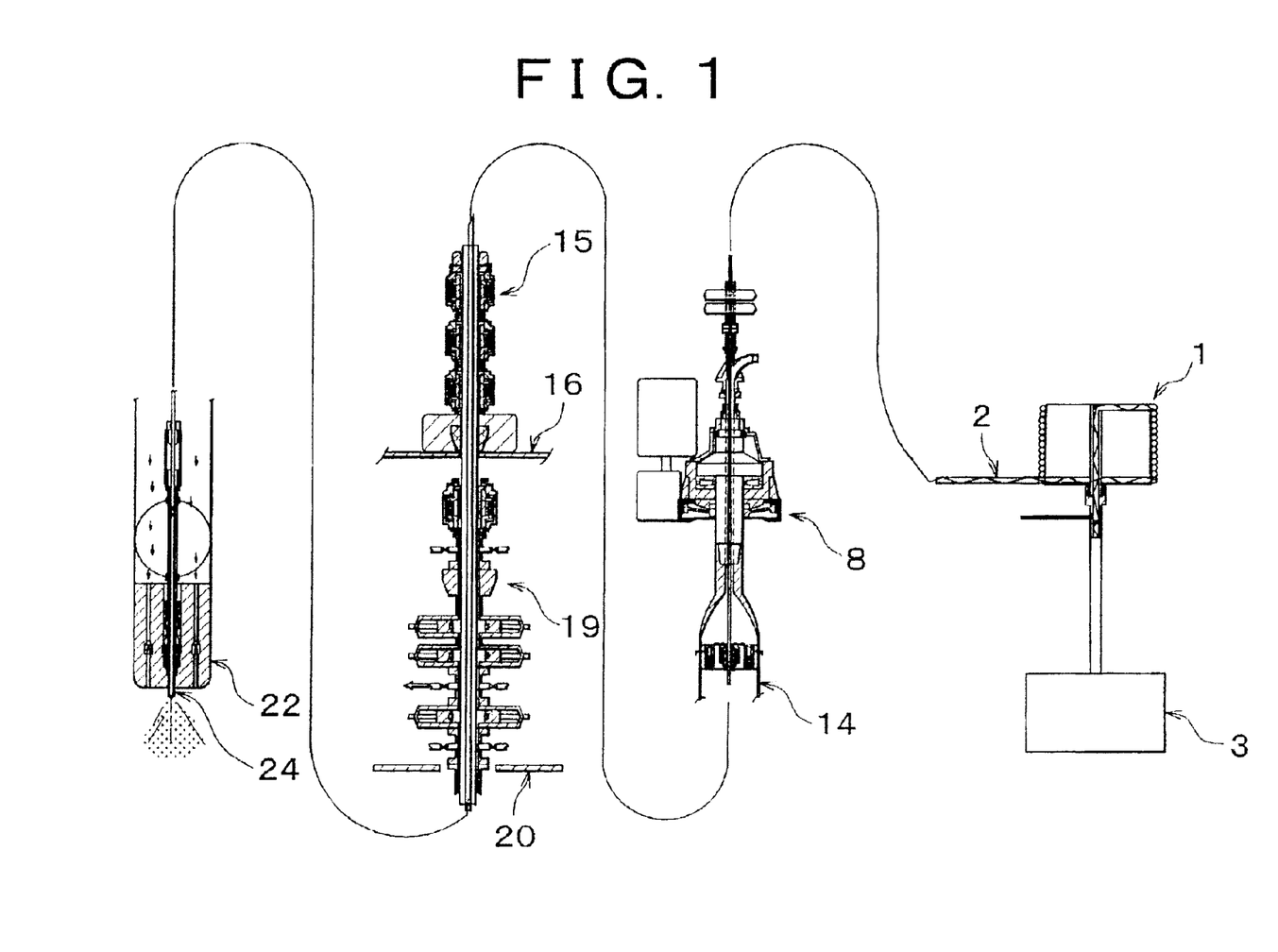
FIG. 1 shows a schematic view of an example embodiment of the system.
Figure 2:
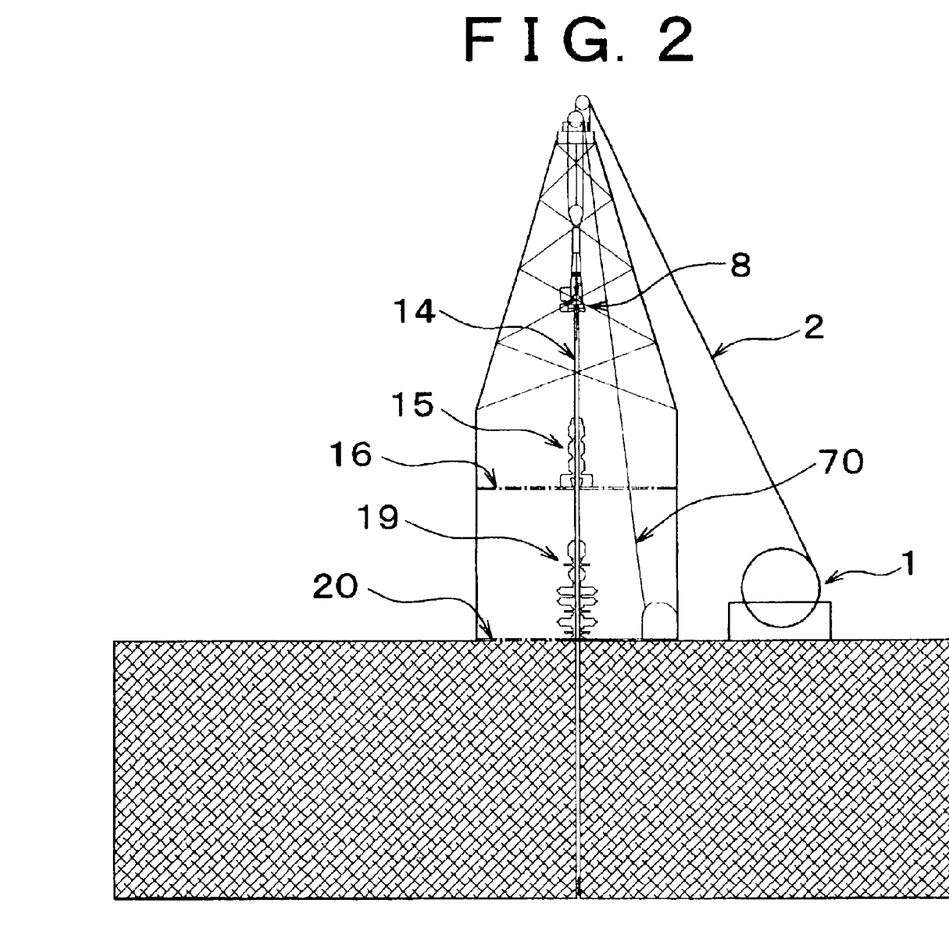
FIG. 2 shows a section view of an example embodiment of the invention.
Figure 3:
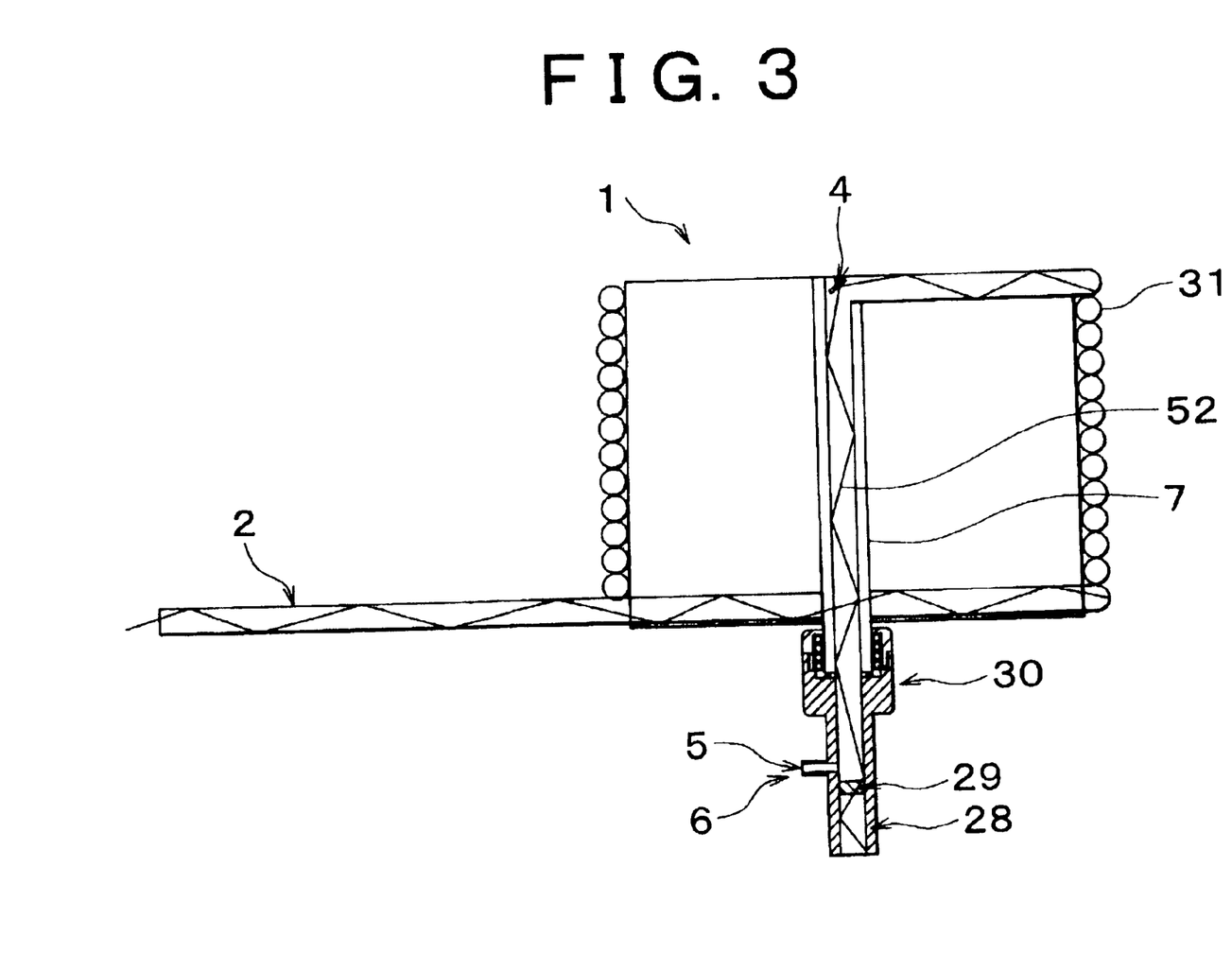
FIG. 3 shows a section view of an example embodiment of the invention.

FIG. 1 shows an overall view of an example embodiment of the invention for boring a well with a laser beam. FIGS. 2 and 3 show example embodiments of how the elements shown in FIG. 1 are arranged in a more specific embodiment.

FIG. 3 shows a spooling apparatus 1 has an internally reflective conduit 2 coiled around it. The spooling apparatus 1 winds and unwinds the conduit 2 from the spool as more or less length is required. The laser 3 shines a laser beam 52 into the inlet head 28 that passes through the optical lens 29 into the spool shaft 7. The laser beam 52 that passes through the hollow spool shaft 7 of the spooling apparatus 1, reflects off the mirror 4, and passes into the conduit 2. The laser beam 52 first passes through the section 31 of the conduit 2 that is wrapped around the spooling apparatus 1. Using the methods and systems provided a laser beam 52 produced by a laser 3 on the surface is transmitted into a well and effectively bores the well.

Gas 6 is injected through an inlet port 5 into the hollow spool shaft 7 of the spooling apparatus 1, and gas 6 then flows into the conduit 2. In one embodiment, the conduit 2 comprises a tube having a curved cross-section; in another embodiment, the conduit 2 comprises a multi-sided tube. In still other embodiments, the conduit 2 comprises still other cross-sectional shapes.

The laser 3 is a chemical oxygen-iodine laser (COIL) in one embodiment. The COIL generates excited oxygen molecules that activate disassociated iodine molecules to produce a laser beam 52. See, e.g., "Development of a 1 kw COIL for Industrial Use," by F. Wani, N. Naitou, T. Nagai, M. Iizuka, H. Tsuji and H. Fujii, Proceedings of Laser Advanced Materials Processing (LAMP '92), Science and Applications, Jun. 7–12, 1992 Niigata, Japan, incorporated herein by reference. Such COIL systems are known those of skill in the art.

Figure 4:
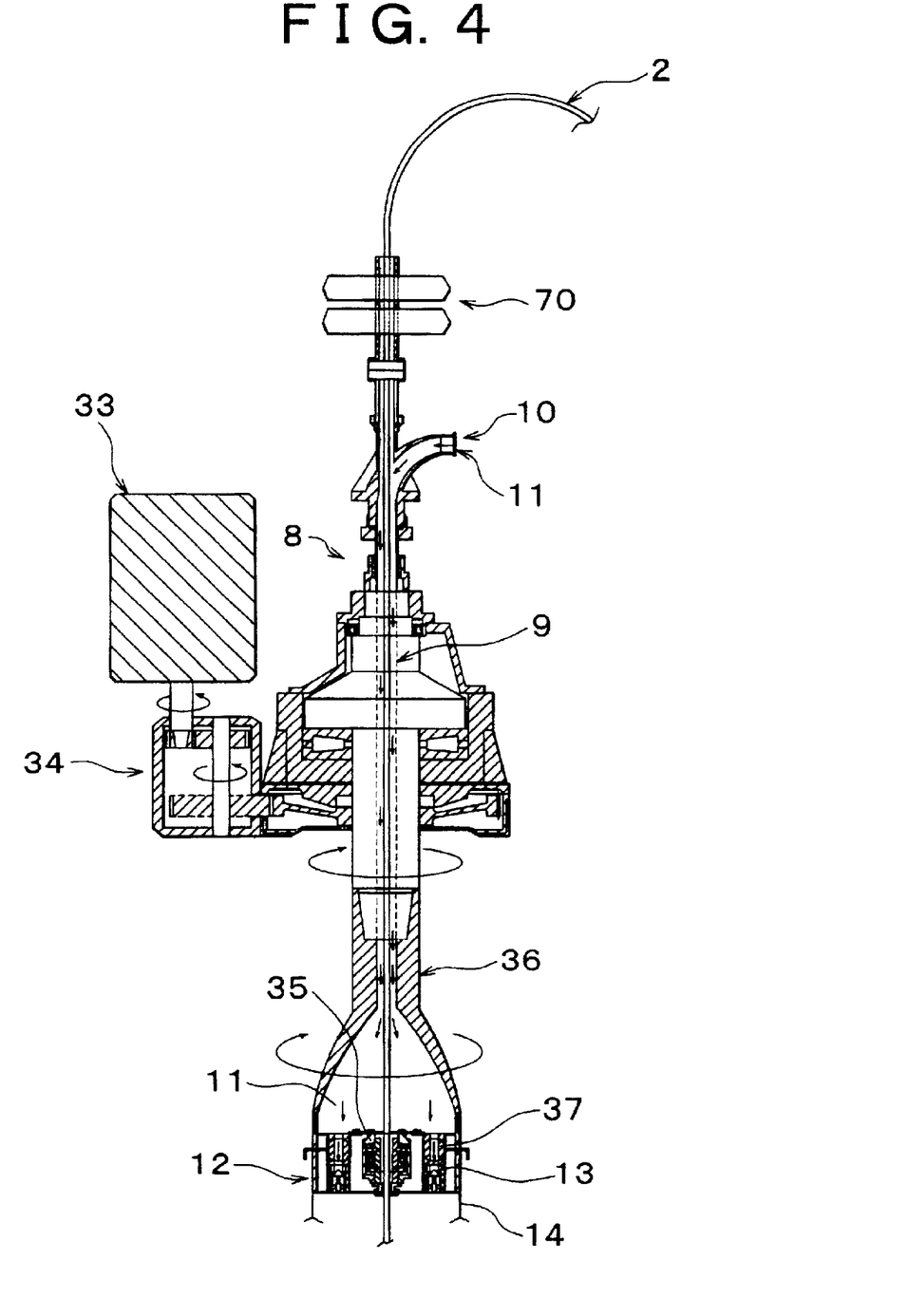
FIG. 4 shows a section view of an example embodiment of the invention.

The conduit 2 is extended to a top drive 8, shown in FIG. 4, which has a hollow center 9 through which the conduit 2 passes, in some embodiments. The conduit 2 first passes through a blow-out protection device 70 before entering the top drive 8. Fluid 11 is injected into the hollow center 9 through an inlet port 10, thereby filling an annulus between the conduit 2 and the hollow center 9 of the top drive 8. In some embodiments, the fluid 11 comprises a compressible fluid. In other embodiments, the fluid 11 comprises an incompressible fluid. In still other embodiment, the fluid 11 comprises a mixture of compressible and incompressible fluid. In one specific example, nitrogen gas is used as a compressible fluid. When the top drive 8 is coupled with the casing 14, fluid 11 flows into the casing 14 through the control valve 37. This control valve 37 is operated by various means in alternative example embodiments including, but not limited to, electrical, hydraulic and manual control systems.

In at least one embodiment, the casing 14 is rotated to prevent it from sticking to the walls of the well. The motor 33 and gear box 34 apply a rotational force to the saver sub 36 that is coupled to the casing 14, thereby applying a rotational force to the casing 14, in at least one embodiment. The motor 33 drives a pinion gear, which in turn delivers rotational power to a drive gear attached to the saver sub 36. In the foot 12 of the top drive 8 is the rotary control head 35 that forms a seal around the conduit 2.

The conduit 2 extends through the foot 12 of the top drive 8, and the fluid 11 passes through the non-return valves 13 in the foot 12. The foot 12 couples with the casing 14. In some embodiments, the conduit 2 passing through the foot 12 enters the casing 14 in a substantially coaxial fashion. In other embodiments, the conduit 2 does not enter or remain essentially coaxial with the casing 14. The casing 14 is rotated with power supplied by the top drive 8 while in the well in order to prevent it from sticking to the wall of the well. The casing 14 comprises a tube having a curved cross-section in one embodiment, and other cross-sectional shapes are acceptable according to other embodiments. By using the conduit 2 provided, the high-powered laser beam 52 is transmitted into the well still in focus.

Figure 5:
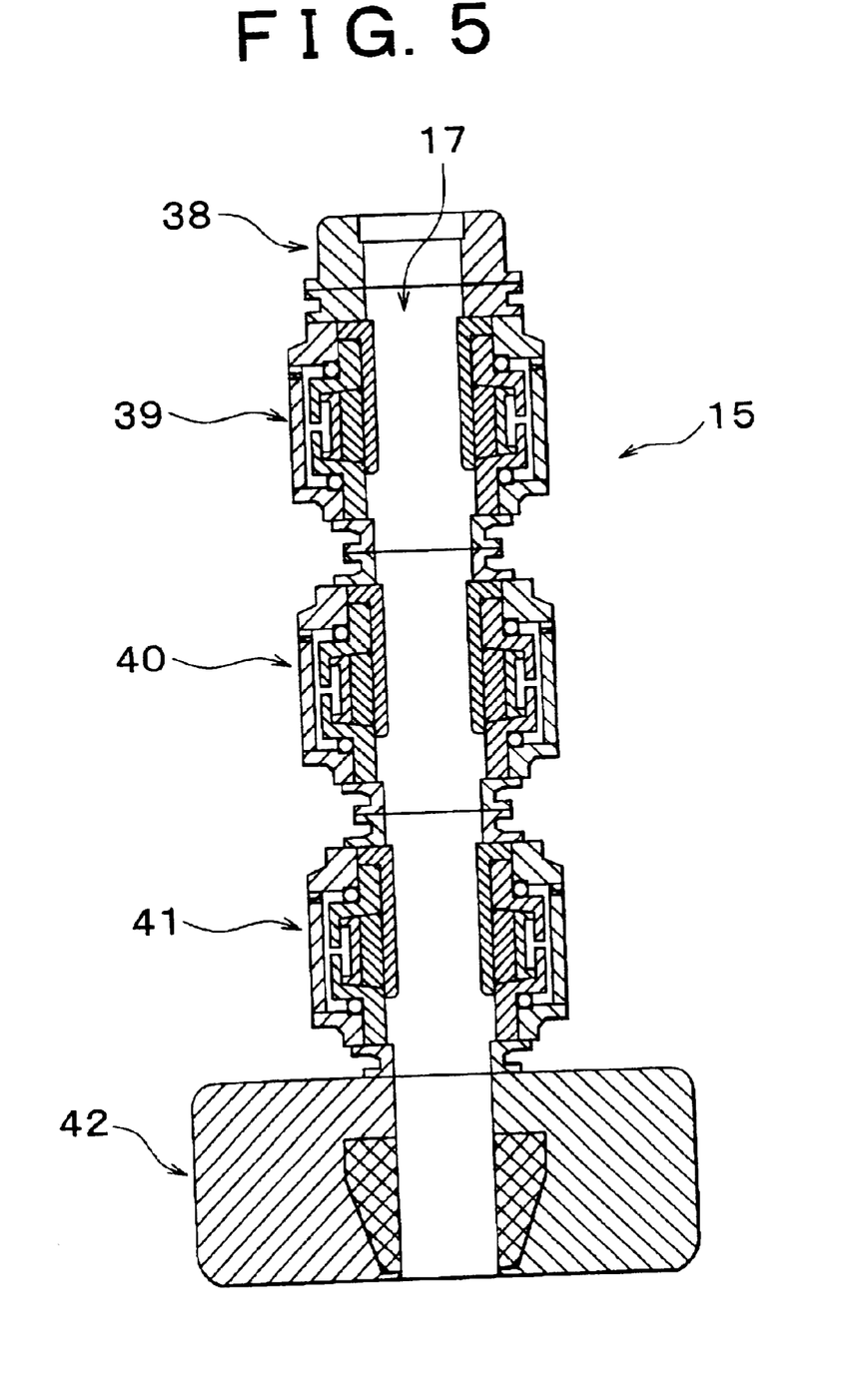
FIG. 5 shows a section view of an example embodiment of the invention.

Both the casing 14 and the conduit 2 are directed into the rotary control head stack 15 located on the drill floor 16 such as the example embodiment depicted in FIG. 5. In some embodiments, the rotary control head stack 15 has a hollow center 17 through which the casing 14 and the conduit 2 pass. When new sections of casing 14 must be added, the top drive 8 is decoupled from the casing 14, and the conduit 2 is decoupled into two sections. The rotary control head stack 15 maintains the pressurization of both the gas 6 inside the section of conduit 2 and fluid 11 in the section of casing 14 that remains in the well bore.

The top element of the rotary control head stack 15, comprises a rotary table 38 for the conduit 2. When additional sections of casing 14 are added, a plug 43 is introduced into the rotary table 38 to maintain the pressurization in the bottom section of the conduit 2 and casing 14. Beneath the rotary table 38 is an upper rotary control head 39 that forms an inflatable seal around the casing 14. Beneath the upper rotary control head 39 is the variable rotary control head 40, which forms an inflatable seal around the conduit 2. The lower rotary control head 41 forms an inflatable seal around the casing 14, and the casing slip 42 is at the bottom of the rotary control head stack 15 to support the entire stack.

Figure 6:
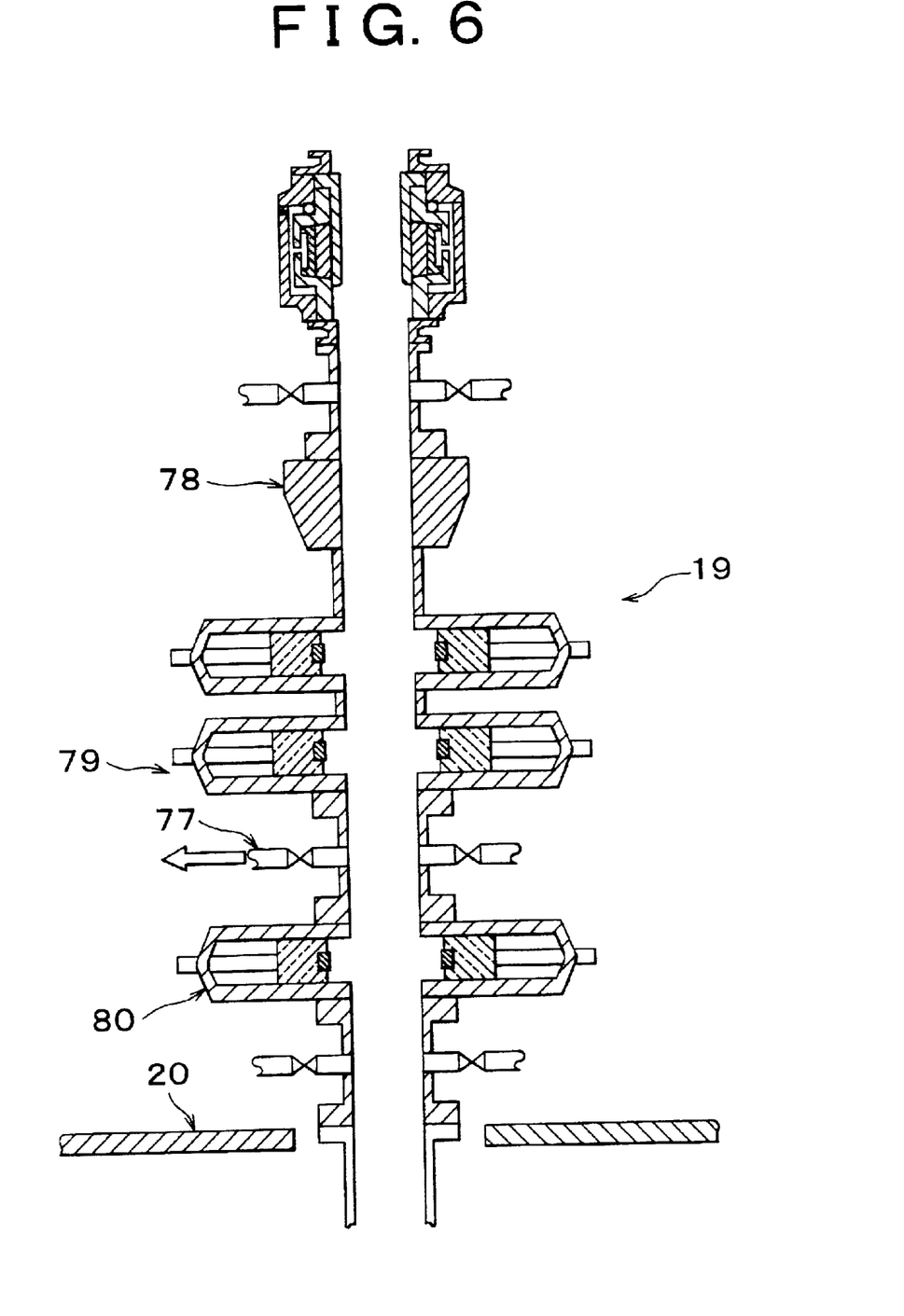
FIG. 6 shows a section view of an example embodiment of the invention.

FIG. 6 illustrates an example embodiment of an above-ground blow-out-protection stack that the casing 14 and the conduit 2 are directed through. In the embodiment depicted, the pipe ram 80 and the blind ram 79 provide for closing the well in case of a pressure surge. In case of a pressure surge, outlet port 77 releases the drilling fluids and debris. The annular preventor 78 maintains a seal around the casing 14.

Figure 7:
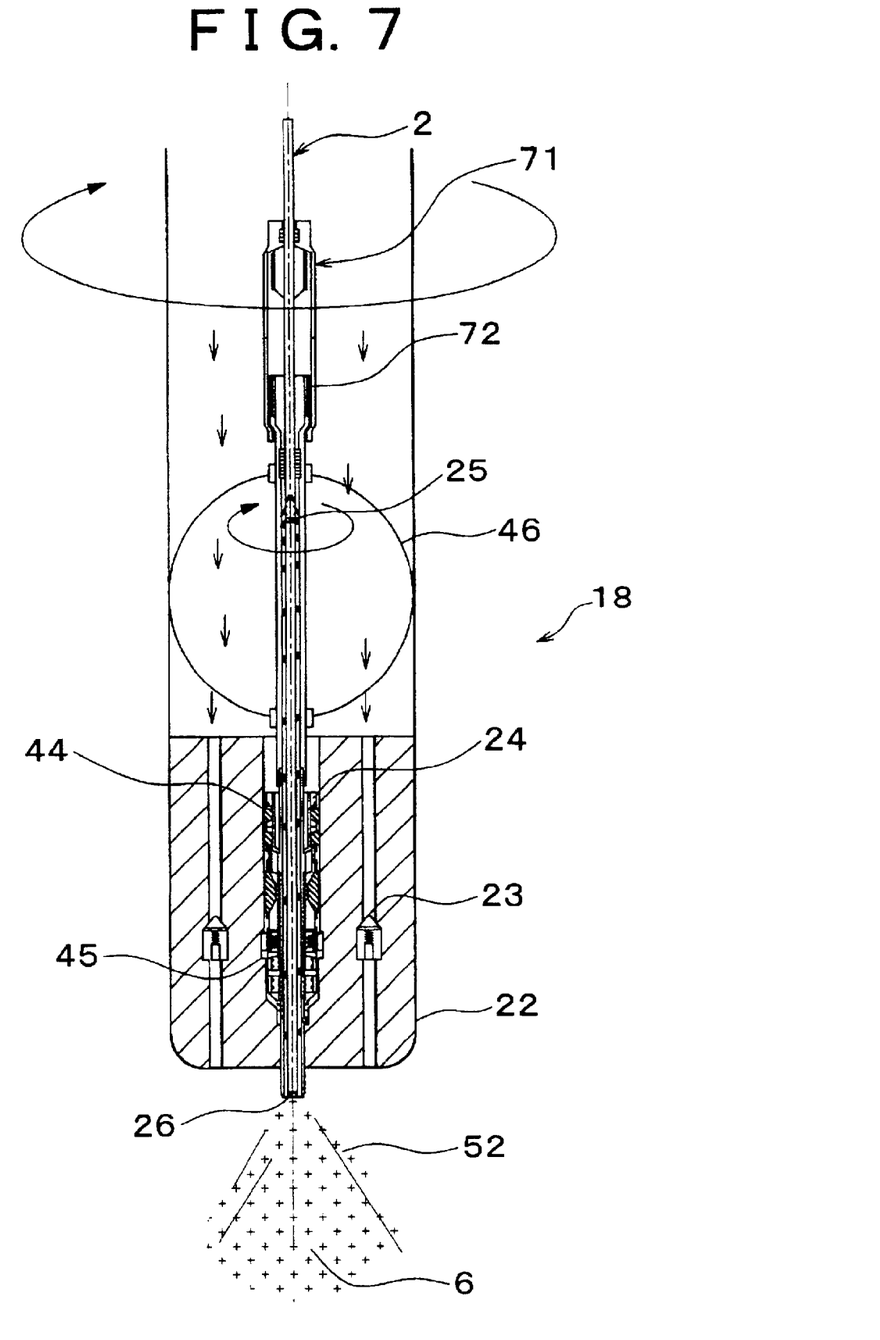
FIG. 7 shows a section view of an example embodiment of the invention.
Figure 8:
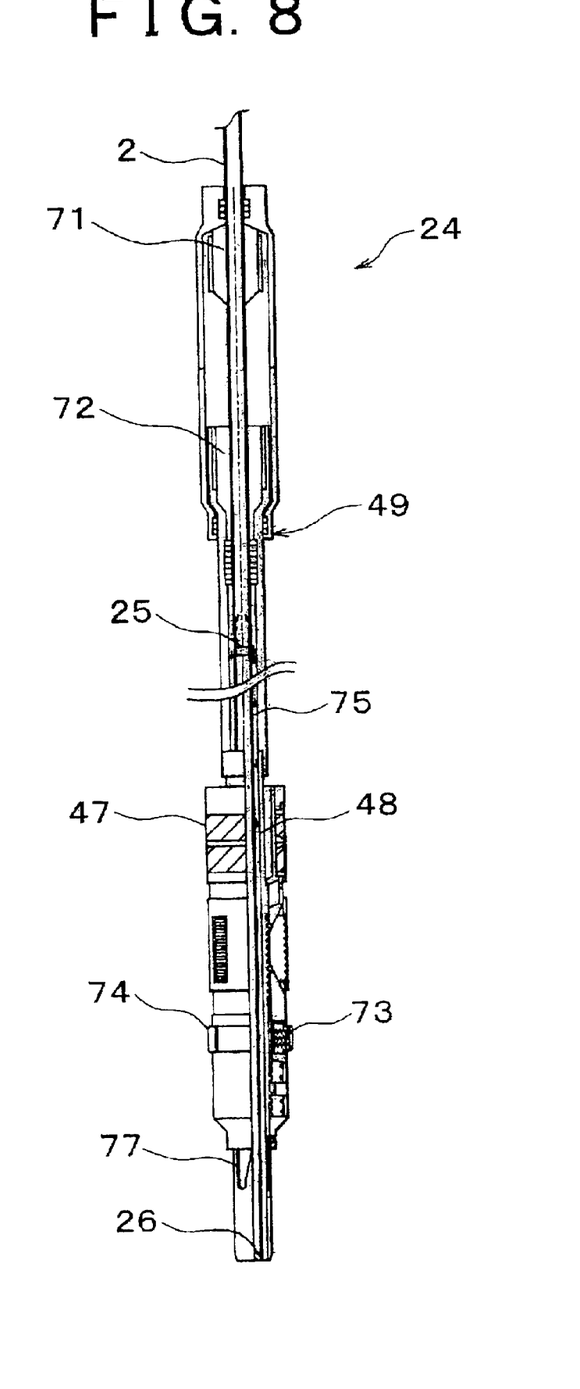
FIG. 8 shows a section view of an example embodiment of the invention.

FIGS. 7 and 8 illustrate a cutting structure at the end of the casing 14 used according to one example embodiment. The casing shoe 22 is coupled with the last casing segment 14. The nozzle 24 comprises an outer barrel 47 and an inner barrel 48. The outer barrel 47 and the inner barrel 48 are connected with a swivel 49 that allows the outer barrel 47 to rotate with casing shoe 22 and casing 14 while the conduit 2 and the inner barrel 48 remain stationary. In one embodiment, the section of the outer barrel 47 above the casing shoe 22 is held in position by one or more centralizers 46 connected to the casing 14.

The conduit 2 contains a diverting lens 25 that diverts the gas 6 from the conduit 2 into the annulus between the conduit 2 and the inner barrel 48. Laser beam 52 passes through the diverting lens 25 and then passes through the diverging lens 26 into the well bore. By passing through a diverging lens 26, the laser beam 52 expands in diameter when entering the well bore, thereby expanding the area vaporized by a laser beam 52 narrow enough to be transmitted into the well. The gas 6 passing around the conduit 2 flows into the well bore and is guided with diverting plates to the front of the diverging lens 26. This gas 6 flow is intended to keep the diverging lens 26 essentially free of debris. In alternative embodiments, there are no lenses 25 or 26. The casing shoe 22 also contains non-return valves 23 that allow fluid 11 to flow from the casing 14 into the well bore.

The laser beam 52 entering the well bore heats and vaporizes the material inside the well. In some embodiments, the laser beam 52 heats and vaporize material in the well that it does not directly illuminate. In some embodiments, the vaporization comprises sublimating the material in the well, while, in still other embodiments, the vaporization comprises spalling, melting and evaporating the material in the vicinity of the well. In the illustrated example, the vaporized material is evacuated from the well bore through the annulus between the well and the casing 14 using either or both the gas 6 from the conduit 2 and the fluid 11 from the casing 14 injected into the well bore.

Figure 9:
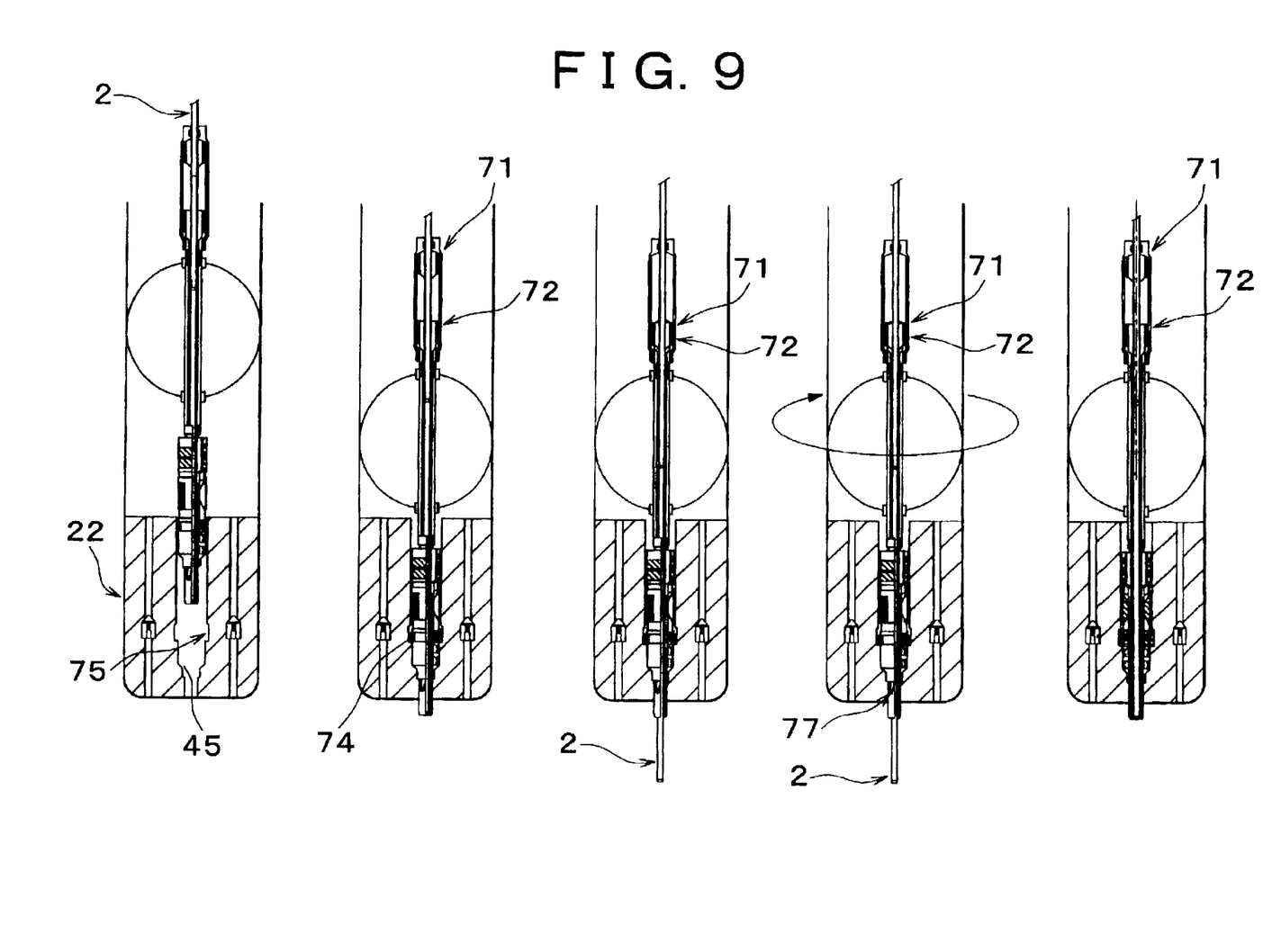
FIG. 9 shows a section views illustrating a process embodiment of the invention.

The nozzle 24 in one embodiment is engaged with the casing shoe 22 using a procedure shown in FIG. 9. To engage the nozzle 24 with the casing shoe, in one embodiment, the nozzle 24 is lowered into the hole in the center of the casing shoe 22, so that the nozzle 24 comes to rest on the no-go shoulder 45. The no-go shoulder 45 then holds the nozzle 24 stationary while the conduit 2 is further extended. This extension causes the spline 71 to engage with the female spline 72 in the inner barrel 48 of the nozzle 24. Once the spline 71 engages with the female spline 72, the inner barrel 48 is fixed to the conduit 2. The conduit 2 is incapable of rotating and prevents the inner barrel 48 from rotating. In this embodiment, the casing shoe 22 and the outer barrel 47 are then rotated, causing the outer barrel 47 to engage with the casing shoe 22.

In one embodiment, engagement results from inserting a spring 73 loaded axial dog 74 into a groove 75 in the casing shoe 22. In other embodiments, a J-type setting system 77 is used to make the outer barrel 47 rotate with the casing shoe 22. This engagement holds the nozzle 24 in the casing shoe 22. The conduit 2 then retracts to its drilling position, thereby disengaging the spline 71 from the female spline 72.

With the nozzle 48 engaged and the spline 71 and the female spline 72 disengaged, the nozzle 24 rotates with the casing shoe 24 but independently of the conduit 2.

Figure 10:
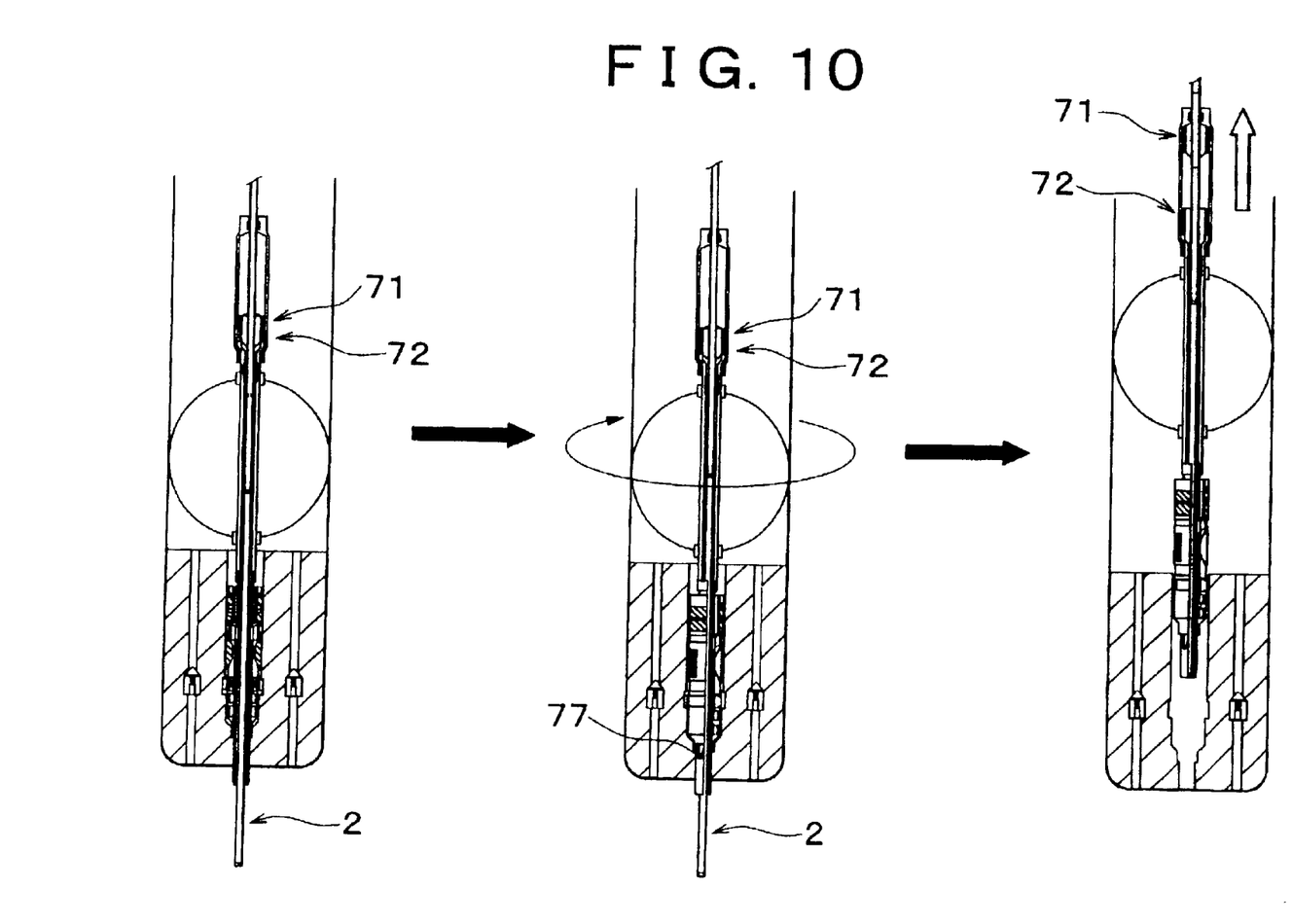
FIG. 10 shows a section views illustrating a process embodiment of the invention.

In embodiments where the nozzle 24 has been engaged with the casing shoe 22, the nozzle 24 is later disengaged using a procedure illustrated in FIG. 10. To disengage, the conduit 2 is extended again so that the spline 71 engages with the female spline 72. Once the inner barrel 48 is fixed to the conduit 2 and will not rotate, the casing shoe 22 rotates thereby disengaging the outer barrel 47 of the nozzle 24 from the casing shoe 22. The conduit 2 is then retracted, so that the spline 71 is disengaged from the female spline 72.

Figures 111, 112, 113:
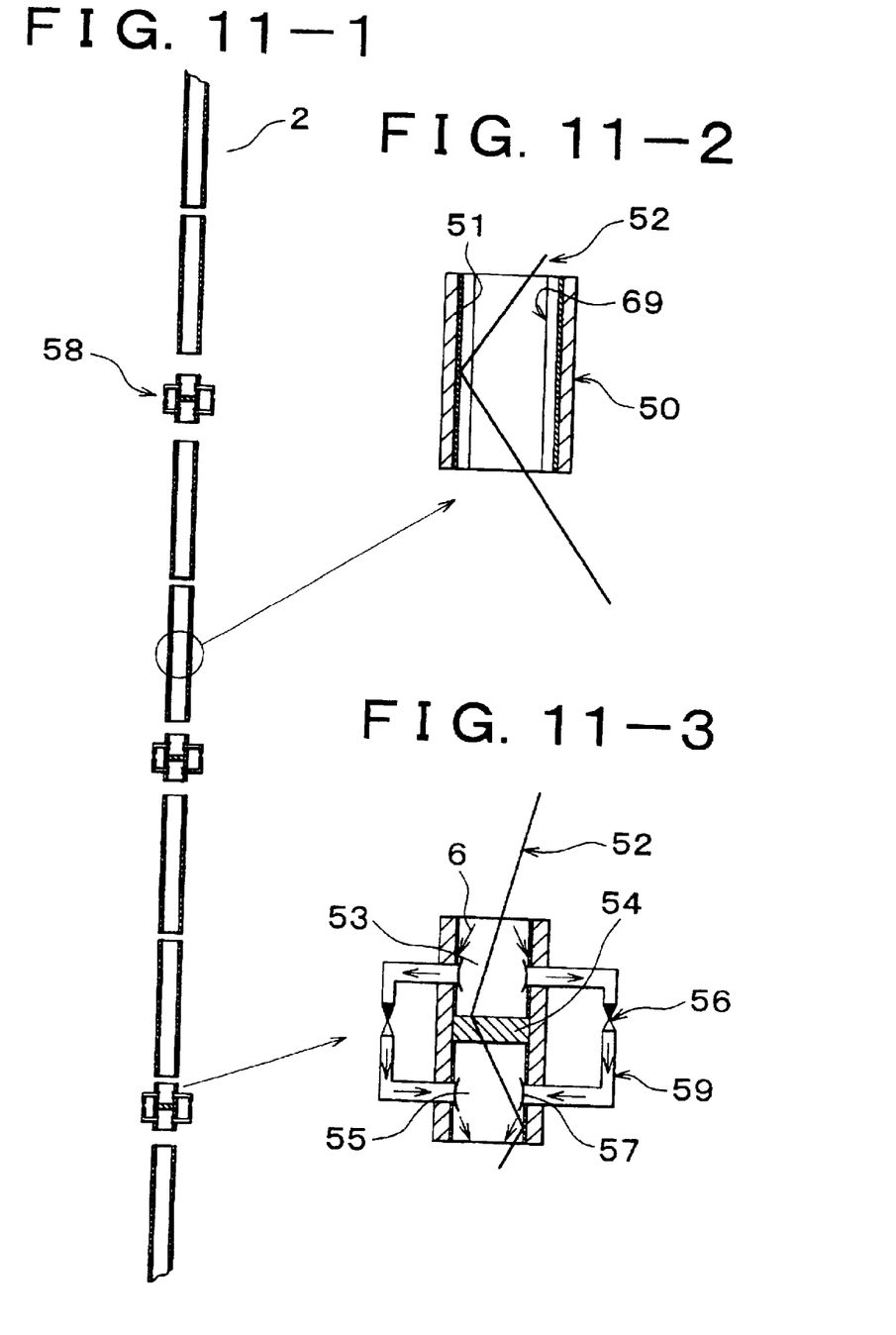
Figure 121:
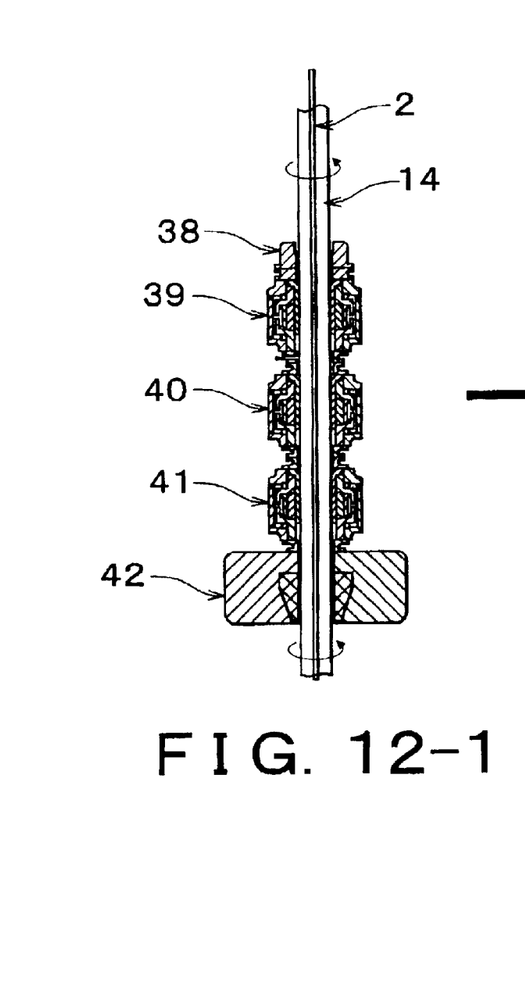
Figure 122:
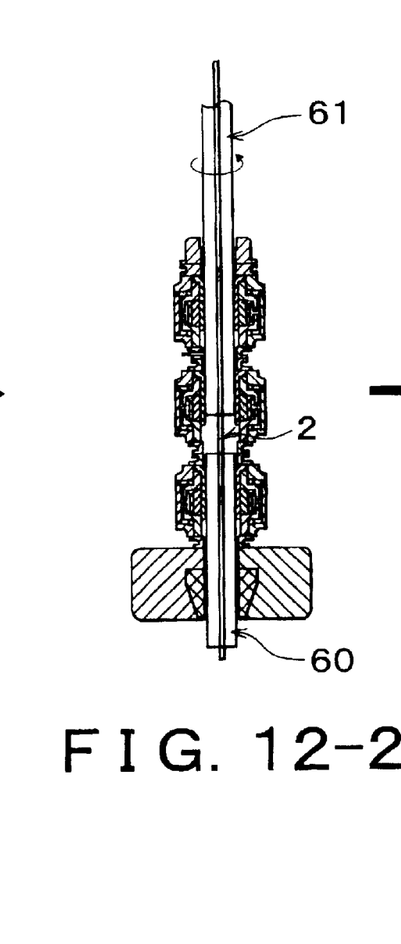
Figure 123:
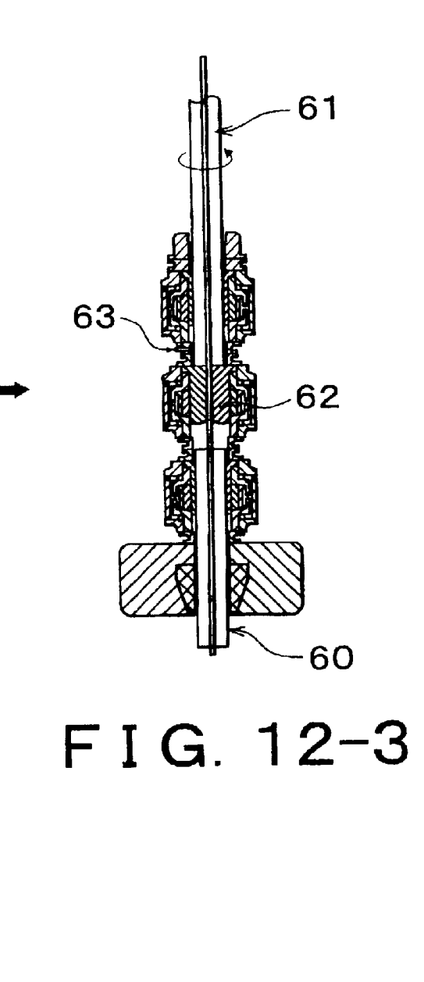
Figure 131:
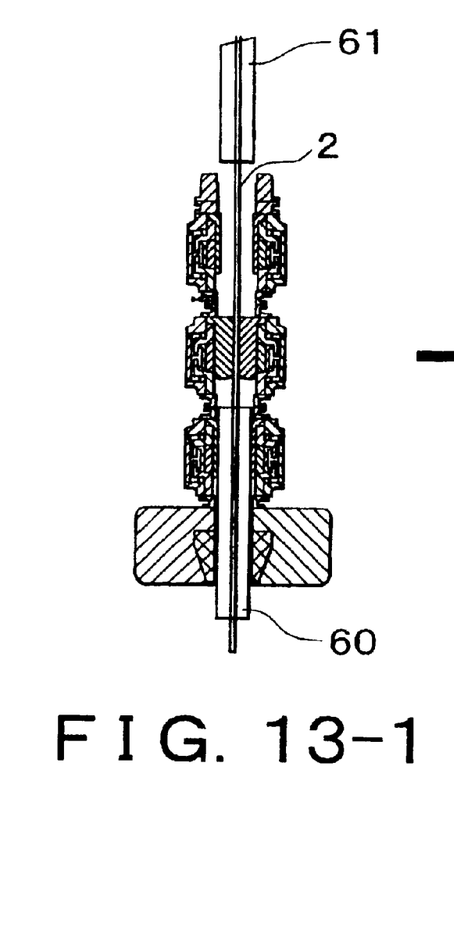
Figure 132:
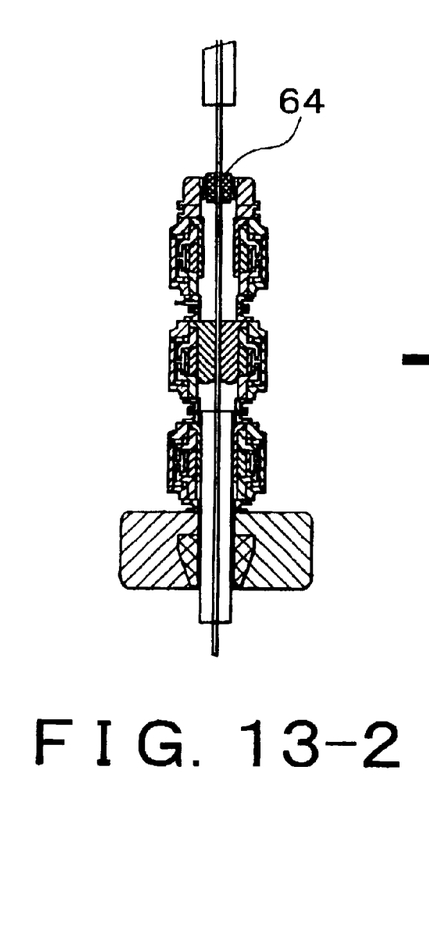
Figure 133:
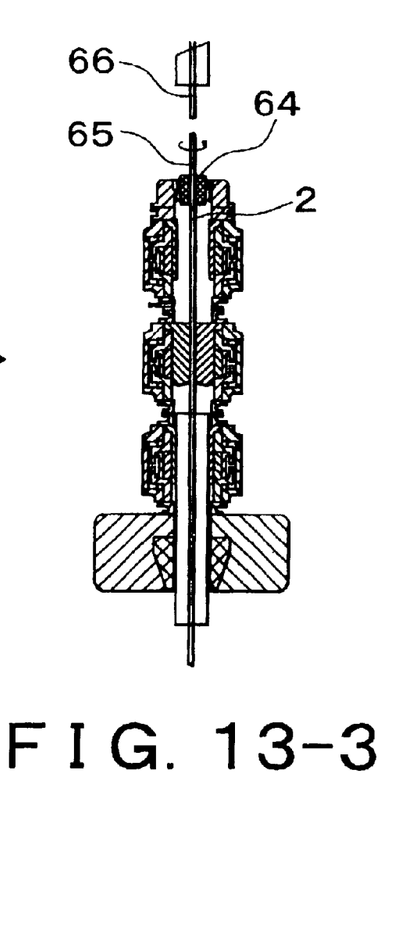
Figure 141:
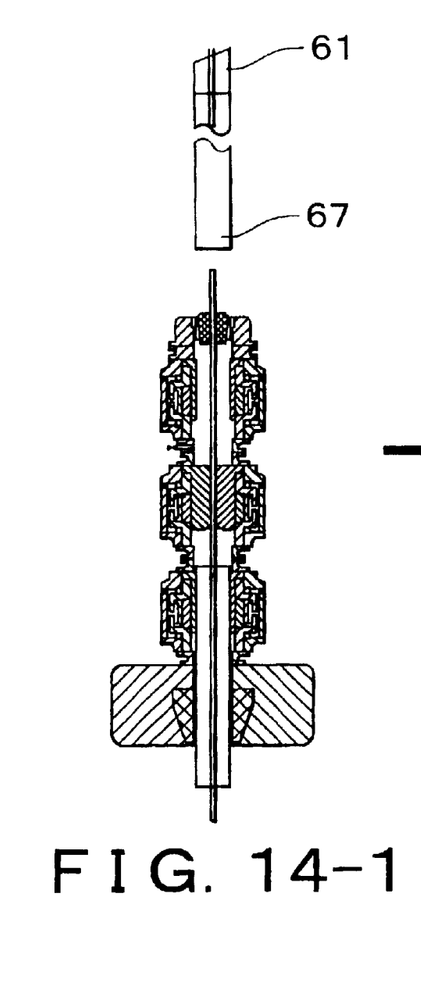
Figure 142:
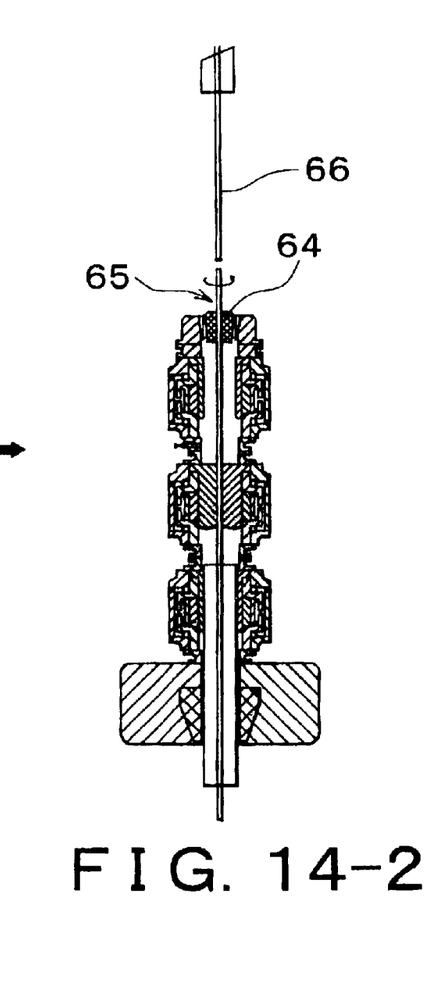

FIGS. 11-1, 11-2, and 11-3 illustrate an example structure of the conduit useful according to one example embodiment. The conduit 2 comprises segments of flexible coil tubing 50 connected by joints 58 that couple with two segments of coil tubing 50 as shown in FIG. 11-1. In some embodiments, the tubing 50 comprises steel. In alternative embodiments, the tubing 50 comprises composite material.

In a variety of examples, the conduit 2 is internally reflective, so that conduit 2 guides laser beam 52; and, in some more specific embodiments, the inside of the conduit 2 includes a coating 51 comprising, for example, aluminum. In alternative embodiments, the coating 51 comprises copper; and, in still alternative embodiments, the coating 51 comprises silver, or any combination of the above or mixtures/alloys of the above which are internally reflective of laser beam 52. In one embodiment, an additional layer 69 of dielectric material is applied onto the coating 51. In yet another embodiment, a reflective surface is inserted into the conduit 2.

In various embodiments, segments of tubing 50 are connected by joints 58 as shown in FIG. 11-3, which are coated on the inside in a fashion similar to the tubing, to reflect the laser beam 52. In one example embodiment, the joint 58 is separated into an upper section 53 and a lower section 55 by an optical lens 54, which allows the laser beam 52 to pass through it from the upper segment 53 to the lower segment 55.

In one example embodiment, the gas 6, flowing through the conduit 2, passes around the optical lens 54, located in the joint 58, and through one or more non-return valves 56, located in a by-pass channel 59. This non-return valve 56 allows the gas 6 to pass from the upper section 53 to the lower section 55, but it will not allow the gas 6 to flow the opposite direction. In one example embodiment, at the entrance and exits of the by-pass channels 59 are reflecting plates 57 that reflect the laser beam 52 and prevent it from entering the by-pass channel 59.

FIGS. 12 though 15 illustrate an example embodiment of the process used to insert an additional section of casing. FIG. 12-1 shows the casing 14 being disconnected into two sections. The bottom section 60 is held stationary by the lower rotary control head 41 while the upper section 61 continues to rotate, thereby disconnecting the two sections. The lower rotary control head 41 forms a seal around the casing in order to maintain the pressure inside the well bore. FIG. 12-2 shows the upper section of casing 61 being removed from rotary control head stack 15. While this is happening, the variable width seal element 62 is inflated until a seal is formed around the conduit 2. The pressure inside the upper section of the casing 61 is bled off through the pressure release valve 63. FIG. 12-3 shows the upper section of the casing 61 being completely removed from the rotary control head stack 15. Before the casing is removed, the pressure inside the upper section of the casing 61 is equalized by bleeding it off through the pressure release valve 63.

FIG. 13-1 shows the insertion of the slip 64 into the top of the rotary control head stack 15. Slip 64 prevents the conduit 2 from rotating, when the conduit 2 is disconnected into sections. As seen in FIG. 13-2, conduit 2 is broken into a top section 66 and a bottom section 65. In one example embodiment, the conduit 2 is disconnected into sections by preventing the bottom section 65 from rotating while the top section 66 is rotated. FIG. 13-3 shows an additional section 67 of the casing 14 being connected to the bottom of the upper section of the casing 61, and FIG. 14-1 shows the top section 66 of the conduit 2 being extended and reconnected to the bottom section 65 of the conduit 2. FIG. 14-2 shows the slip 64 being removed after the top section 66 of the conduit 2 is again supporting the weight of the bottom section 65.

Figure 143:
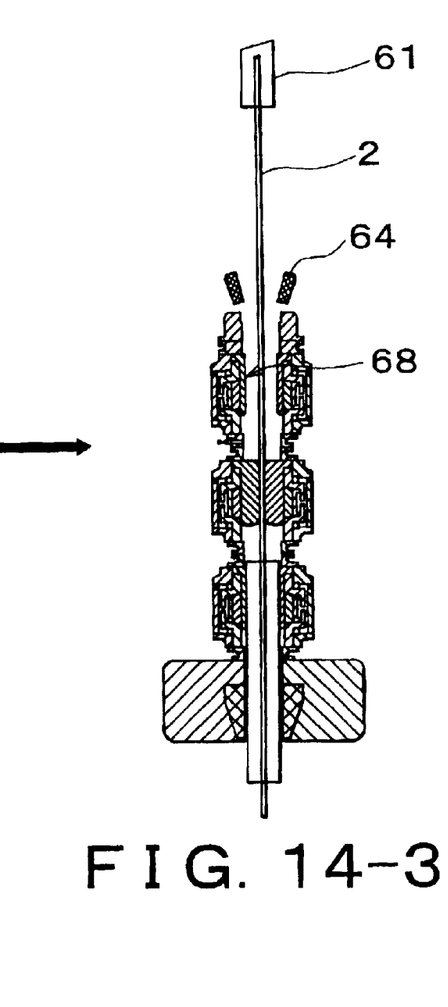
Figure 151:
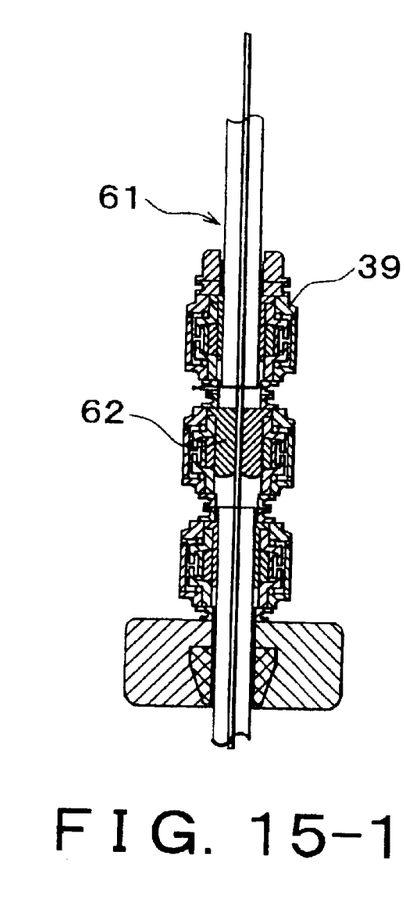

In FIG. 14-3, the top section 61 of the casing 14 is re-inserted into the rotary control head stack 39. Once the top section of casing is inserted, the seal element 68 in the upper rotary control head 39 is inflated, and it forms a seal around the upper section of casing 61. FIG. 15-1 shows the variable width seal element 62 being deflated.

Figure 152:
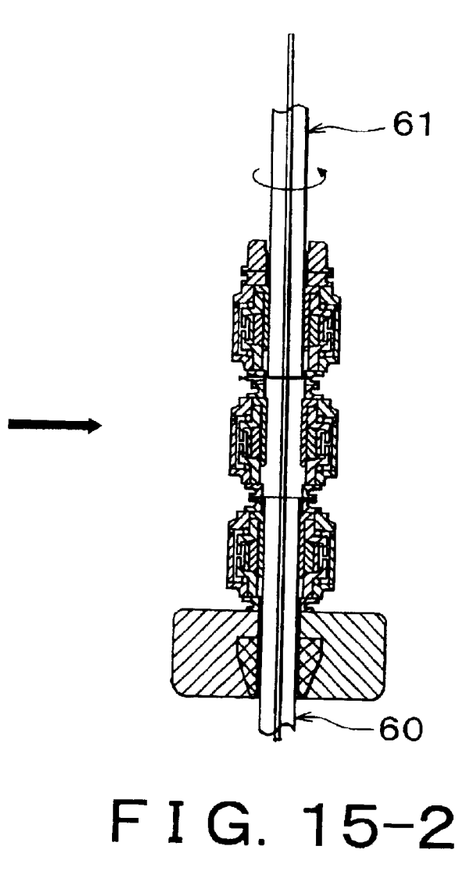
Figure 153:
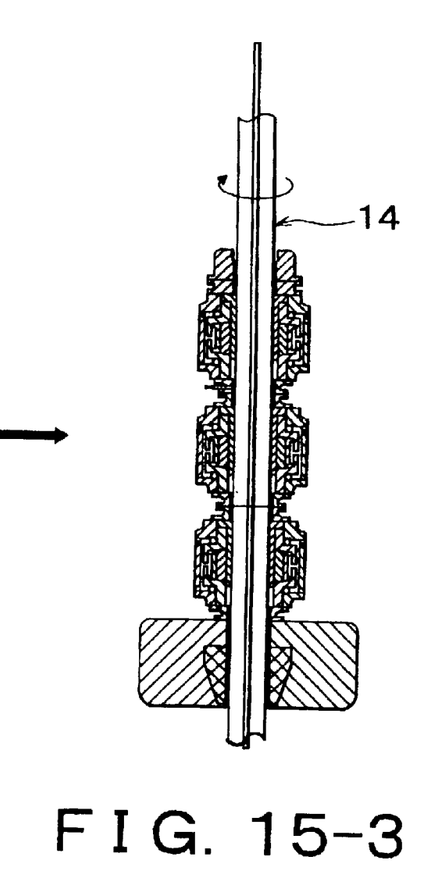

FIG. 15-2 shows the top section of the casing 61 being further inserted into the rotary control head stack 41. In one example embodiment, the top section of the casing 61 is then screwed together with the bottom section of the casing 60 as in FIG. 15-3.

According to a further aspect of the invention, a system for boring a well with a laser beam 52, is provided. In some embodiments, the system comprises a means 3 for shining the laser beam 52 into a conduit 2, wherein the laser beam is guided through the conduit 2 by the internal reflectivity of conduit 2; and a means 1 for extending the conduit 2 into the well, so that the laser beam 52 exiting the conduit 2 shines onto an area in the well to be bored. Means 52 is provided for vaporizing the material at the area to be bored, and in some examples includes a means for further comprises a means 26 for diverging the laser beam 52 exiting the conduit 2. In the illustrated example, means 51 alone or in combination with means 62 provide internal reflectivity Means 5 for injecting gas 6 into the conduit 2 is also provided, as is a means 2 and 59 for transporting the gas 6 into the well, and a means 24 for injecting gas 6 into the well. A means for protecting the diverging lens 26 from the environment inside the well includes a means 27 for directing the gas 6 injected into the well towards the diverging lens 26. As discussed above, in some embodiments, the gas 6 is inert. In another embodiment, the gas 6 comprises nitrogen. A means 25 is provided for diverting the gas 6 around the diverging lens 26, as is a means 54 and 56 for blocking the backflow of the gas 6 in the conduit 2. Also included in the illustrated example 15 is a means for evacuating vaporized material from the well.

A means 15 for extends a casing 14 into the well, while a means 8 prevents the casing 14 from sticking to the wall of the well bore; and, in one embodiment, a means 8 for rotating the casing 14 is provided. Further, means 49 connects the conduit 2 and the casing 14, wherein the casing 14 is rotatable and the conduit 2 is stationary. Means 46 holds the conduit 2 essentially coaxially aligned with the casing 14. Means 10 injects fluid 11 into the casing 14; a means for 14 transports the fluid 11 into the well; and a means 23 for injects the fluid 11 into the well.

There is also illustrated a means for unwinding the conduit 2.

The above Summary and Detailed Description are given by way of example only. Other aspects and examples of the invention will be understood to be within the spirit of the present invention and with the scope of or equivalent to that described by the claims.

What is claimed:

1. A method for boring a well with a laser beam, the method comprising:
   shining the laser beam into a conduit, wherein the laser beam is guided through the conduit by the internal reflectivity of said conduit; and
   extending the conduit into the well, so that the laser beam exiting the conduit shines onto an area in the well to be bored.

2. A method as in claim 1, further comprising:
   vaporizing material at the area in the well to be bored; and
   evacuating vaporized material from the well.

3. A method as in claim 1, further comprising diverging the laser beam exiting the conduit.

4. A method as in claim 1, further comprising injecting gas into the well.

5. A method as in claim 4, further comprising diverging the laser beam exiting the conduit.

6. A method as in claim 4, further comprising diverting the gas around a diverging lens.

7. A method as in claim 4, further comprising protecting a diverging lens from the environment inside the well.

8. A method as in claim 7, wherein said protecting the diverging lens comprises directing the gas injected into the well towards the diverging lens.

9. A method as in claim 4, further comprising blocking the backflow of the gas in the conduit.

10. A method as in claim 1, further comprising extending a casing into the well, so that the conduit is inside of the casing when the conduit is extended into the well.

11. A method as in claim 10, further comprising connecting the conduit and the casing, wherein the casing is rotatable and the conduit is stationary.

12. A method as in claim 11, further comprising rotating the casing.

13. A method as in claim 10, further comprising holding the conduit essentially coaxially aligned with the casing.

14. A method as in claim 10, further comprising:
   injecting fluid into the casing;
   transporting the fluid into the well through the casing; and
   injecting the fluid into the well.

* * * * *